(12) United States Patent
Anderson et al.

(10) Patent No.: US 8,431,955 B2
(45) Date of Patent: Apr. 30, 2013

(54) METHOD AND STRUCTURE FOR BALANCING POWER AND PERFORMANCE USING FLUORINE AND NITROGEN DOPED SUBSTRATES

(75) Inventors: Brent A. Anderson, Jericho, VT (US); Terence B. Hook, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 12/840,689

(22) Filed: Jul. 21, 2010

(65) Prior Publication Data
US 2012/0018812 A1    Jan. 26, 2012

(51) Int. Cl.
*H01L 33/00* (2010.01)

(52) U.S. Cl.
USPC ............ 257/102; 257/371; 257/E21.276; 438/22; 438/157

(58) Field of Classification Search .......... 257/102
See application file for complete search history.

(56) References Cited

U.S. PATENT DOCUMENTS
7,452,574 B2    11/2008    Truskett et al.
2005/0280097 A1 *  12/2005    Anderson et al. .......... 257/371
2008/0067636 A1 *  3/2008    Shimizu et al. .......... 257/651
2010/0003573 A1    1/2010    Jeanne et al.
2010/0075508 A1    3/2010    Seino et al.

FOREIGN PATENT DOCUMENTS
| DE | 10004402 | 8/2001 |
| JP | 1179365 | 7/1989 |
| JP | 3106035 | 5/1991 |
| JP | 2003171480 | 6/2003 |

* cited by examiner

*Primary Examiner* — Ajay K Arora
(74) *Attorney, Agent, or Firm* — Gibb & Riley, LLC; David A. Cain, Esq.

(57) ABSTRACT

Methods and systems evaluate an integrated circuit design for power consumption balance and performance balance, using a computerized device. Based on this process of evaluating the integrated circuit, the methods and systems can identify first sets of integrated circuit transistor structures within the integrated circuit design that need reduced power leakage and second sets of integrated circuit transistor structures that need higher performance to achieve the desired power consumption balance and performance balance. With this, the methods and systems alter the integrated circuit design to include implantation of a first dopant into a substrate before a gate insulator formation for the first sets of integrated circuit transistor structures; and alter the integrated circuit design to include implantation of a second dopant into the substrate before a gate insulator formation for the second sets of integrated circuit transistor structures. The method and system then output the altered integrated circuit design from the computerized device and/or manufactures the device according to the altered integrated circuit design.

23 Claims, 4 Drawing Sheets

METHOD AND STRUCTURE FOR BALANCING POWER AND PERFORMANCE USING FLUORINE AND NITROGEN DOPED SUBSTRATES

BACKGROUND

1. Field of the Invention

The present invention relates to integrated circuit devices, and more specifically, to the use of fluorine and nitrogen doped substrates for balancing power and performance within circuit designs.

2. Description of Related Art

As the size of the integrated circuit devices is continually reduced, more and more devices are included within a given chip. However, as more circuits are included on each chip, the need to balance the performance and power consumption within the chip becomes an increase in priority. This need is sometimes difficult to achieve because efficiencies are gained by manufacturing as many different devices as possible using simultaneous processing. Therefore, it is most desirable to achieve performance and power balancing in a process that does not require substantial changes to the integrated circuit manufacturing steps.

SUMMARY

In view of the foregoing, one exemplary embodiment herein is a transistor device that includes a channel region within a substrate, and source and drain regions within the substrate. The channel region is positioned between the source and drain regions. A high dielectric constant (high K) gate insulator (having a dielectric constant above 3.9) is positioned on and connected to a surface of the substrate at a position where the channel region is located. Further, a predetermined concentration of fluorine is within the substrate at a position where the gate insulator contacts the substrate. A gate conductor is on and connected to the gate insulator.

Another exemplary integrated circuit device embodiment herein comprises a plurality of sets of integrated circuit transistor structures on a substrate. The integrated circuit structures have gate insulators positioned on and contacting the substrate. First sets of the integrated circuit transistor structures within the integrated circuit device have a first dopant in the substrate at a position where the corresponding gate insulator of the first sets of the integrated circuit transistor structures contacts the substrate. This first dopant reduces power leakage of the first sets of the integrated circuit transistor structures relative to power leakage of other integrated circuit transistor structures within the integrated circuit device. Second sets of the integrated circuit transistor structures within the integrated circuit device have a second dopant in the substrate at a position where a corresponding gate insulator of the second sets of the integrated circuit transistor structures contacts the substrate. This second dopant increases performance of the second sets of the integrated circuit transistor structures relative to performance of other integrated circuit transistor structures within the integrated circuit device.

One exemplary method of designing an integrated circuit herein evaluates an integrated circuit design for power consumption balance and performance balance, using a computerized device. Based on this process of evaluating the integrated circuit, the method can identify first sets of integrated circuit transistor structures within the integrated circuit design that need reduced power leakage and second sets of integrated circuit transistor structures that need higher performance to achieve the desired power consumption balance and performance balance. With this, the method alters the integrated circuit design to include implantation of a first dopant into a substrate before a gate insulator formation for the first sets of integrated circuit transistor structures; and alters the integrated circuit design to include implantation of a second dopant into the substrate before a gate insulator formation for the second sets of integrated circuit transistor structures. The method then outputs the altered integrated circuit design from the computerized device.

Another exemplary embodiment herein is a method of manufacturing an integrated circuit. The method evaluates an integrated circuit design for power consumption balance and performance balance, using a computerized device. Based on this process of evaluating the integrated circuit, the method can identify first sets of integrated circuit transistor structures within the integrated circuit design that need reduced power leakage and second sets of integrated circuit transistor structures that need higher performance to achieve the desired power consumption balance and performance balance. With this, the method alters the integrated circuit design to include implantation of a first dopant into a substrate before a gate insulator formation for the first sets of integrated circuit transistor structures; and alters the integrated circuit design to include implantation of a second dopant into the substrate before a gate insulator formation for the second sets of integrated circuit transistor structures. The method then manufactures an integrated circuit device according to the altered integrated circuit design by processing raw materials through manufacturing equipment.

DETAILED DESCRIPTION

As mentioned above, it is desirable to achieve performance and power balancing in a process that does not require substantial changes to the integrated circuit manufacturing process. Conventional systems attempt to balance leakage and performance by providing such structures as multiple thicknesses gate dielectrics, which are formed using dielectric deposition processes that are difficult and expensive.

Further, one of the goals in integrated circuit manufacturing is to provide a transistor that has very low current leakage, but that operates on a high-performance base. One issue with providing low-leakage (room temperature portable standby capability) on a high-performance base is the current leakage that occurs through the gate dielectric, even with the advent of high-dielectric constant gate dielectric materials.

In view of such issues, the embodiments herein utilize a fluorine implant that can reduce gate leakage by as much as five times, when compared to those transistors that do not include the fluorine implant. This utilization of the fluorine implant opens up a critical design space by reducing or eliminating the need to have multiple-thickness gate dielectrics among various devices within an integrated circuit chip. More specifically, by including the fluorine implant in selected ones of the devices, the gate leakage can be controlled (balanced) while still leaving most or all of the gate insulators with the same thickness.

Therefore, as described below, the embodiments herein provide a low cost method and structure to balance power and performance across multiple device types by modification of the dielectric characteristics of a subset of devices. More specifically, embodiments herein perform an implant into the substrate prior to the high dielectric constant gate insulator formation in order to modify the capacitive electrical equivalent thickness and gate leakage characteristics of the gate conductor stack.

The following embodiments achieve these purpose by providing either a fluorine or nitrogen doping of the substrate prior to formation of the gate oxide within the transistor devices to control the power consumption and performance of individual (or groups) of integrated circuit devices.

The embodiments herein do not substantially alter conventional integrated circuit manufacturing steps and only require the additional implantation process. Therefore, as shown below, the embodiments herein allow substantial fine tuning of the power consumption and performance characteristics of individual (or groups of) circuits within a single integrated circuit chip to allow precise performance and power consumption balancing throughout the entire chip through the addition of a single implantation step within the otherwise standard integrated circuit manufacturing processes.

Figure 1:
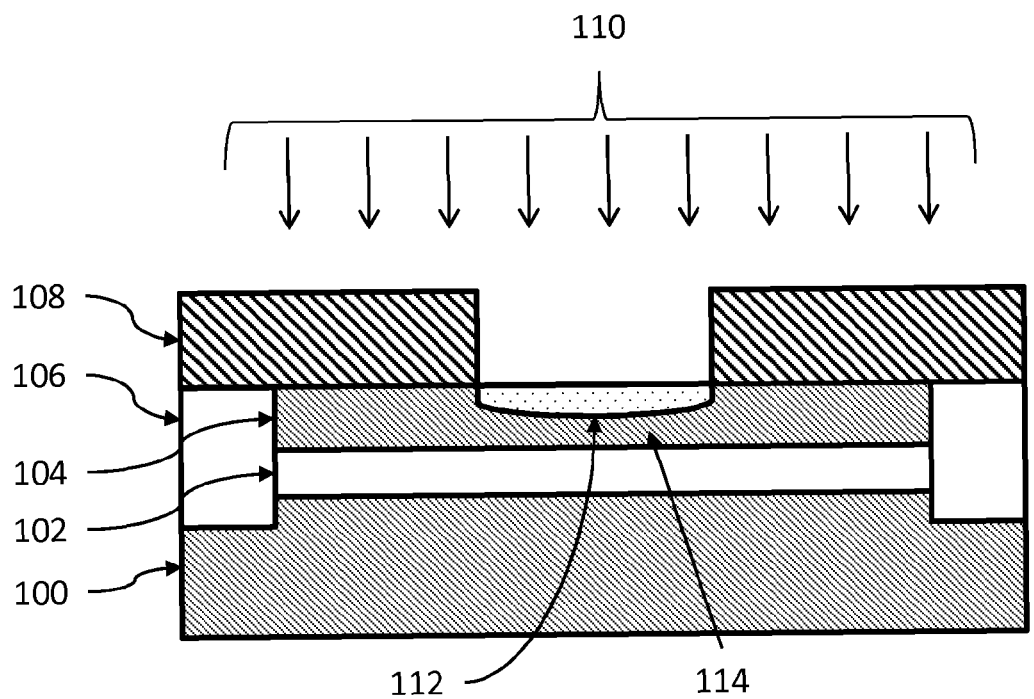
FIG. 1 is a schematic cross-sectional drawing of an integrated circuit structure according to embodiments herein.

More specifically, a partially completed integrated circuit structure is illustrated in FIG. 1. The structure includes a substrate 100 that can comprise any suitable insulating material such as a wafer, ceramic material, insulator, silicon material, etc. If desired, a buried oxide (BOX) insulator layer 102 can be included within the transistor structure between the underlying wafer substrate 100 and an overlying silicon substrate layer 104. The dielectrics (insulators) mentioned herein can, for example, be grown from either a dry oxygen ambient or steam and then patterned. Alternatively, the dielectrics herein may be formed from any of the many candidate high dielectric constant (high-k) materials, including but not limited to silicon nitride, silicon oxynitride, a gate dielectric stack of $SiO_2$ and $Si_3N_4$, metal oxides like tantalum oxide, hafnium silicate, zirconium silicate, hafnium dioxide, and zirconium dioxide, etc. The thickness of dielectrics herein may vary contingent upon the required device performance.

The silicon substrate 104 comprises a semiconductor that will become the channel region 114 of the transistor and can comprise, for example, Si, SiC, SiGe, SiGeC, Ge alloys, GaAs, InAs, TnP, other III-V or II-VI compound semiconductors, or organic semiconductor structures etc. If desired, the substrate 104 can include one or more doped well regions. The silicon substrate 104 and any well regions can be doped differently depending upon whether the transistor will be a positive-type or a negative-type transistor. The impurities used herein can comprises any negative-type impurity (N-type impurity, e.g., phosphorus (P), arsenic (As), antimony (Sb) etc.) or any positive-type impurity (P-type impurity, e.g., boron, indium, etc.) as well as any other types of impurities, whether currently known or developed in the future. Shallow trench isolation (STI) structures 102 are well-known to those ordinarily skilled in the art and are generally formed by patterning openings and growing or filling the openings with a highly insulating material.

Item 108 in FIG. 1 comprises a masking material (mask). The formation of masks is well-known to those ordinarily skilled in the art. Such masks are generally formed of materials that are easily patterned, such as organic photoresist. Organic photoresists change solubility depending upon their exposure to light waves. The exposed (or unexposed) portions of a photoresists are removed in a rinsing process that leaves the photoresists patterned on the underlying material. Alternatively, the masks can be formed of harder materials such as nitrides, etc.

The mask 108 is optional but can be used to limit the regions of the substrate 104 that receive any subsequent processing. Alternatively, the mask 108 can be utilized to protect certain circuits within the integrated circuit chip, while other circuits receive one or more doping steps.

The embodiments herein provide a doping step (illustrated by the arrows 110) at this point within the integrated circuit manufacturing process. This process creates a doped region 112. The doping species selected for implantation into the doped region 112 can either increase the performance of the integrated circuit (and correspondingly increase power consumption) or decrease performance of the integrated circuit (and correspondingly decrease power consumption of the integrated circuit). Doping species that increase performance (and increase power consumption) include nitrogen; while species that decrease current leakage, include fluorine.

Figure 2:
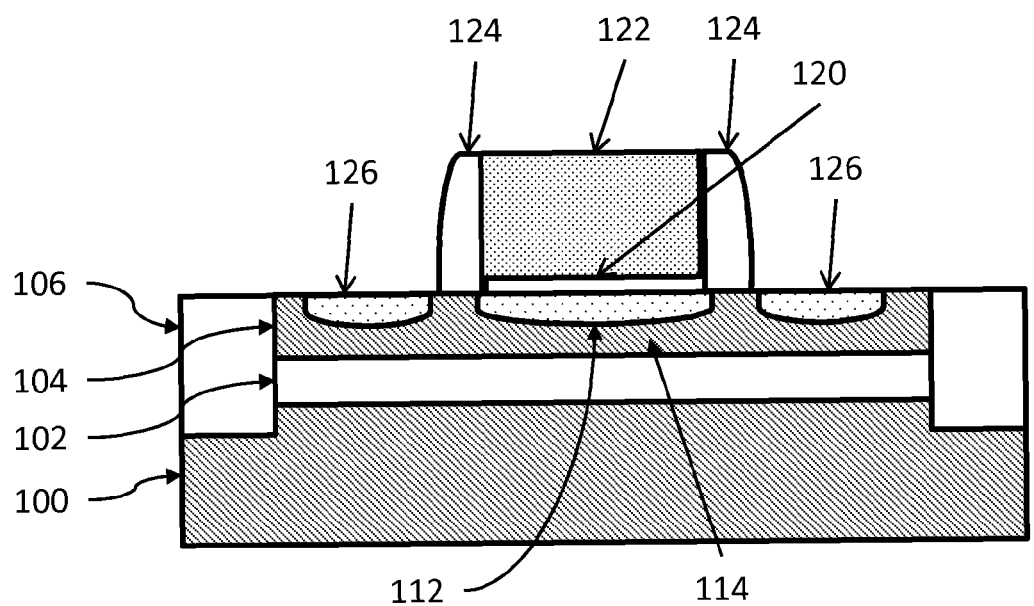
FIG. 2 is a schematic cross-sectional drawing of an integrated circuit structure according to embodiments herein.

As shown in FIG. 2, a gate oxide insulator 120 is formed on the doped region 112 of the silicon substrate 104. The regions on which the gate insulator 120 are grown are controlled (defined) by the mask 108 (or a similar mask). Also, a gate conductor 122 is formed above the gate insulator 120 (again using the mask 108, or a similar mask).

The conductors mentioned herein (such as the gate conductor 122) can be formed of any conductive material, such as polycrystalline silicon (polysilicon), amorphous silicon, a combination of amorphous silicon and polysilicon, and polysilicon-germanium, rendered conductive by the presence of a suitable dopant. Alternatively, the conductors herein may be one or more metals, such as tungsten, hafnium, tantalum, molybdenum, titanium, or nickel, or a metal silicide, and may be deposited using physical vapor deposition, chemical vapor deposition, or any other technique known in the art.

As also shown in FIG. 2, after the mask 108 is removed, the embodiments herein form sidewall spacers 124 on the sidewalls of the gate conductor 122. Sidewall spacers 124 are structures that are well-known to those ordinarily skilled in the art and are generally formed by depositing or growing a conformal insulating layer (such as any of the insulators mentioned above) and then performing a directional etching process (anisotropic) that etches material from horizontal surfaces at a greater rate than its removes material from vertical surfaces, thereby leaving insulating material along the vertical sidewalls of structures. This material left on the vertical sidewalls is referred to as sidewall spacers 124. In addition, various angled implants and other processes can be utilized to create a halo implant around the channel region 114 or to create source and drain extensions (neither of which are illustrated to avoid clutter within the drawings).

Source and drain regions 126 are also formed to complete the basic transistor structure. The source and drain regions 126 include implantation of doping species (such as any of the doping species mentioned above) that increase the conductivity of the regions 126. Further, if desired, silicides (not illustrated) can be formed over the source and drain regions 126 and the gate conductor 122 in a process that deposits a metal over the silicon structures and then performs a thermal annealing process. Further, various additional insulator layers and contacts through such insulator layers can be made to the different points of the transistor structure to connect the transistor to other devices within the integrated circuit chip.

Therefore, one embodiment herein comprises a transistor device that includes a channel region 114 within a substrate 104, and source and drain regions 126 within the substrate 104. The channel region 114 is positioned between the source and drain regions 126. A high dielectric constant (high K) gate insulator 120 (having a dielectric constant above 3.9) is positioned on and connected to a surface of the substrate 104 at a position where the channel region 114 is located. Again, the gate conductor 122 is positioned on and connected to the gate insulator 120.

Further, a predetermined concentration of fluorine 112 is within the substrate 104 at a position where the gate insulator 120 contacts the substrate 104. This predetermined concentration of fluorine comprises an amount that relatively lowers power consumption of the transistor device when compared to transistors that do not include the fluorine implant 112.

The transistor device can comprise any form of transistor, such as a negative type (N-type) transistor, a positive type (P-type) transistor, etc., as well as devices with asymmetric gate dielectrics (where the gate insulator is thicker at the drain region compared to the source region). The embodiments herein can be utilized with super high threshold voltage (Vt) logic device (where the fluorine implant reduces gate leakage) as well as for Low Power static random access memory (SRAM) (where the fluorine implant reduces gate leakage). Thus, the embodiments herein provide the ability to reduce gate leakage in a subset of devices with low cost and fine control as well as the ability to increase performance in a subset of device with low cost and fine control.

Figure 3:
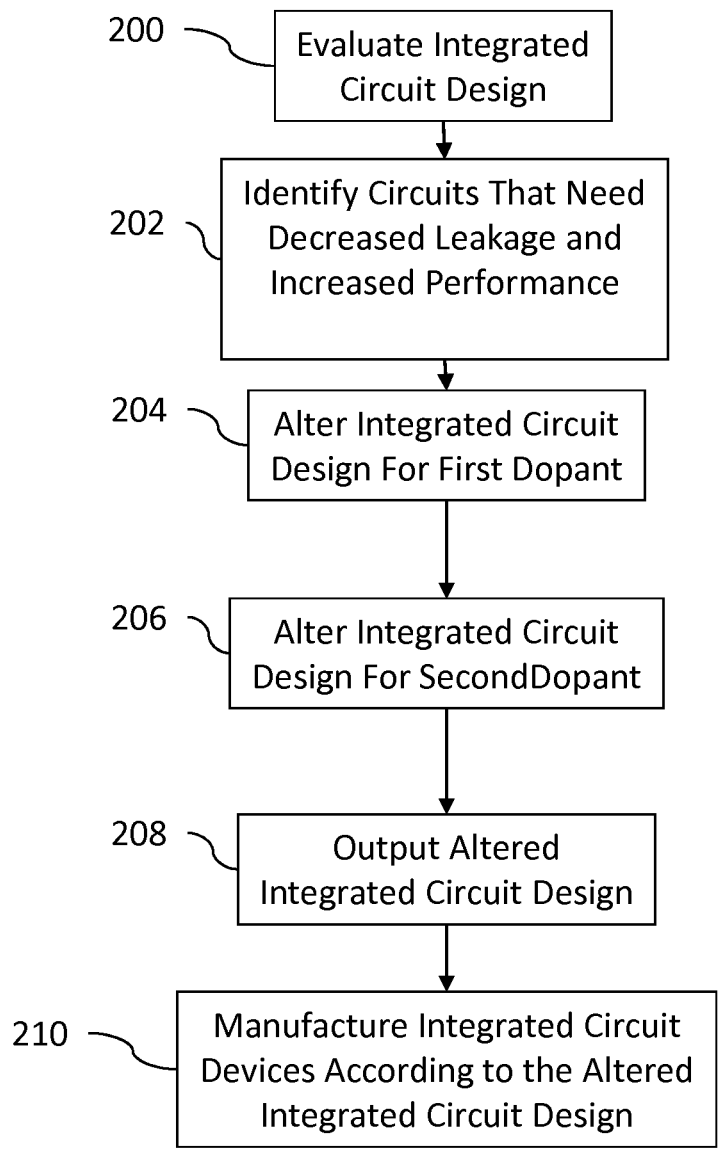
FIG. 3 is a flowchart illustrating processing steps within method embodiments herein.

Further, as mentioned above, the embodiments herein provide the ability to balance performance and power consumption within a given integrated circuit chip. One exemplary process that illustrates the embodiments herein is shown in flowchart form in FIG. 3. More specifically, in item 200 in FIG. 3, the embodiments herein evaluate an integrated circuit design for power consumption balance and performance balance, using a computerized device. For example, in item 200, the embodiments herein can use any conventionally available modeling program that predicts the performance, power consumption, and current leakage of each device (or each group of devices) within the integrated circuit design.

Based on this process of evaluating the integrated circuit 200, the method can identify first sets of integrated circuit transistor structures within the integrated circuit design that need reduced power leakage and second sets of integrated circuit transistor structures that need higher performance to achieve the desired power consumption balance and performance balance in item 202.

With this, the method alters the integrated circuit design to include implantation of a first dopant into a substrate before a gate insulator formation only for the first sets of integrated circuit transistor structures in item 204 (using, for example, the masks discussed above). In item 206, the method can also alter the integrated circuit design to include implantation of a second dopant into the substrate before a gate insulator formation only for the second sets of integrated circuit transistor structures (using, for example, the masks discussed above).

Again, the first dopant can comprise fluorine and the second dopant can comprise nitrogen. Further, the first set of integrated circuit transistor structures can be different types of integrated circuit transistor structures from the second set of integrated circuit transistor structures. The gate insulator formation for the first set of integrated circuit transistor structures can optionally form a different insulator thickness from the gate insulator formation for the second set of integrated circuit transistor structures. Alternatively, the gate insulators of some or all devices on the chip may be formed to have the same thickness.

Both the gate insulator formation for the first set of integrated circuit transistor structures and the gate insulator formation for the second set of integrated circuit transistor structures forms high dielectric constant insulators having dielectric constants above 3.9. Similarly, the gate insulator formation for the first set of integrated circuit transistor structures and the gate insulator formation for said second set of integrated circuit transistor structures forms high dielectric constant insulators comprising silicon nitride, silicon oxynitride, a gate dielectric stack of $SiO_2$ and $Si_3N_4$, metal oxides, tantalum oxide, hafnium silicate, zirconium silicate, hafnium dioxide, or zirconium dioxide.

In item 208, the method then outputs the altered integrated circuit design from the computerized device. In item 210, the method manufactures integrated circuit device according to the altered integrated circuit design (by processing raw materials through manufacturing equipment to transform the raw materials into different items (chips)).

Figure 4:
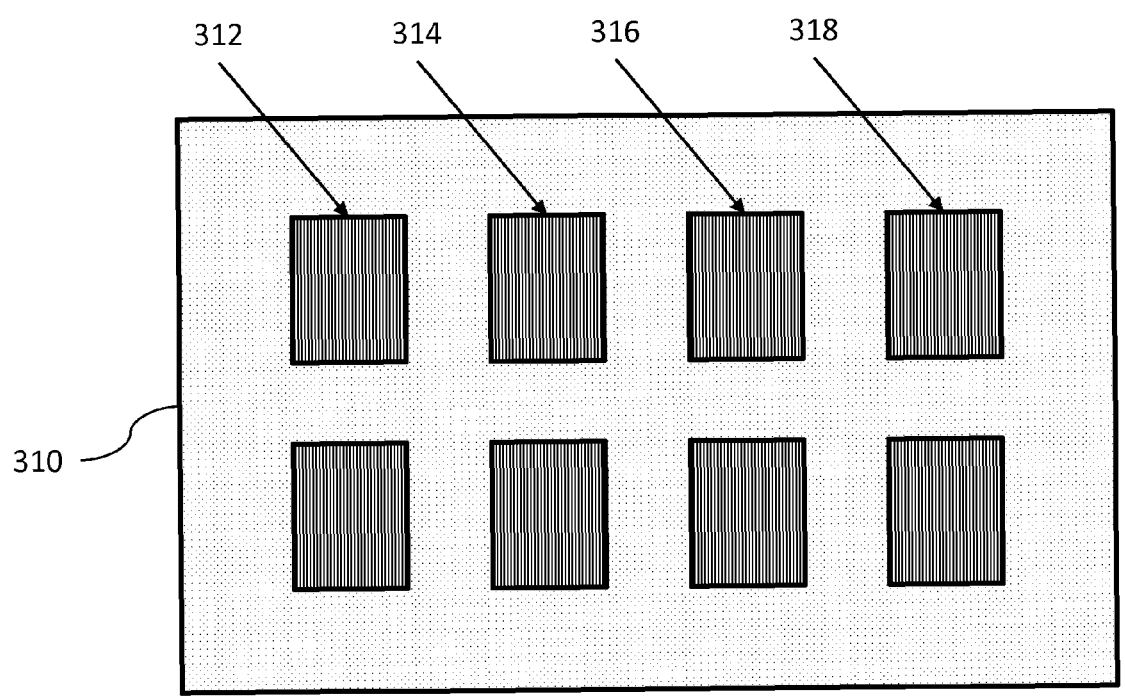
FIG. 4 is a schematic cross-sectional drawing of an integrated circuit structure according to embodiments herein.

One simplified example of an integrated circuit chip that could be produced by the embodiments herein is shown in FIG. 4. More specifically, FIG. 4 illustrates an integrated circuit chip 310 (that could be part of a larger wafer of chips). The chip 310 includes many groups of integrated circuits 312-318, each of which can include very large numbers of transistors, wiring structures, storage structures, etc.

Using the embodiments herein, a first set of integrated circuits 312 may optionally have the regions of the substrates below the gate insulators doped with fluorine to reduce gate conductor leakage. Further, a second set of integrated circuits 318 may optionally have the regions of the substrates below the gate insulators doped with nitrogen to improve performance. Other sets of integrated circuits 316, 318 may not receive either doping. In this way, the embodiments herein can increase the performance of certain transistors (or groups of transistors) and decrease current leakage of other transistors (or groups of transistors) without altering gate insulator thickness in any of the transistors in order to fine tune and balance the performance, power consumption, and current leakage across the entire chip 310 so as to achieve any desirable balance point.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
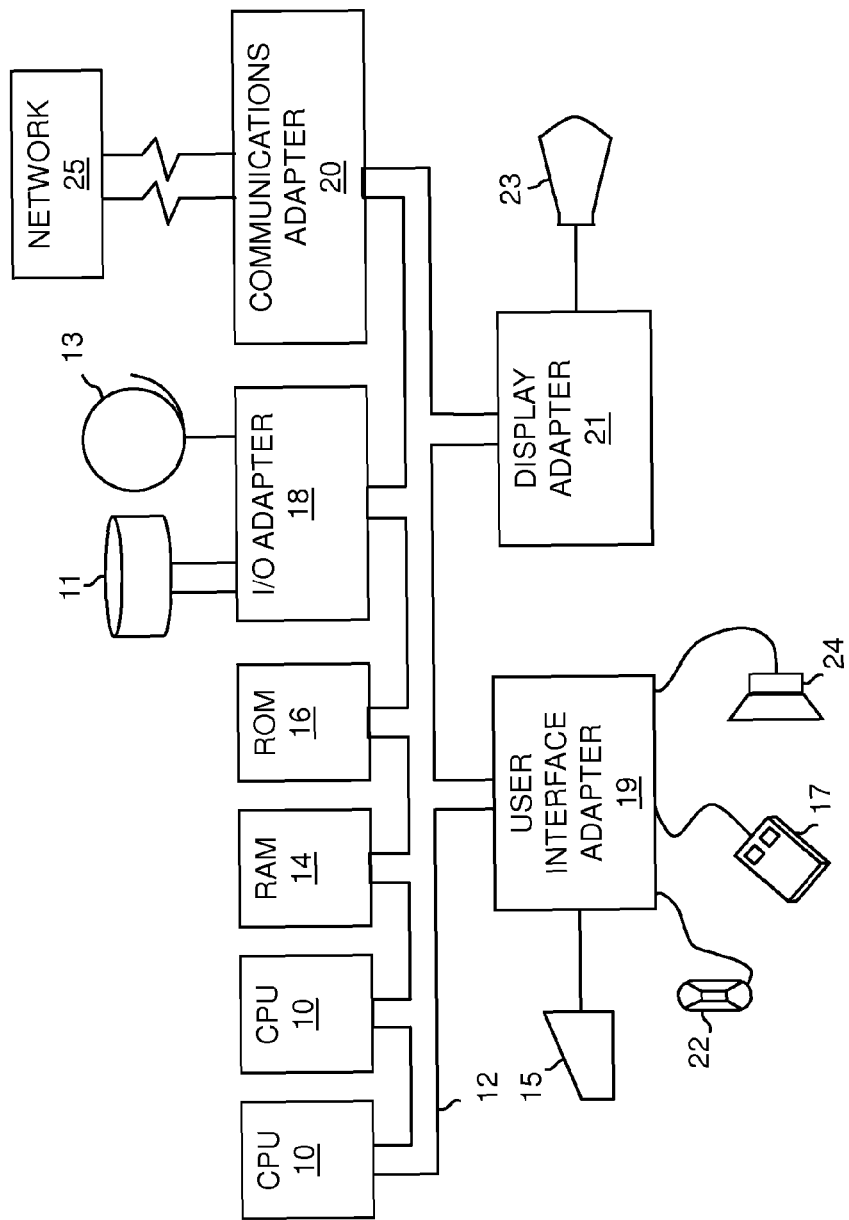
FIG. 5 is a schematic drawing of a hardware structure according to embodiments herein.

A representative hardware environment for practicing the embodiments of the invention is depicted in FIG. 5. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A transistor device comprising:
a substrate;
a channel region within said substrate;
source and drain regions within said substrate, said channel region being positioned between said source and drain regions;
a high dielectric constant gate insulator positioned on and connected to a surface of said substrate at a position where said channel region is located;
a predetermined concentration of fluorine within said substrate at a position where said high dielectric constant gate insulator contacts said substrate; and
a gate conductor on and connected to said high dielectric constant gate insulator,
said high dielectric constant gate insulator having a greater thickness adjacent said drain relative to a thickness adjacent said source.

2. The transistor device according to claim 1, said high dielectric constant gate insulator having a dielectric constant above 3.9.

3. The transistor device according to claim 1, said high dielectric constant gate insulator comprising one of silicon nitride, silicon oxynitride, a gate dielectric stack of $SiO_2$ and $Si_3N_4$, metal oxides, tantalum oxide, hafnium silicate, zirconium silicate, hafnium dioxide, and zirconium dioxide.

4. The transistor device according to claim 1, said predetermined concentration of fluorine comprising an amount that relatively lowers power consumption of said transistor device.

5. The transistor device according to claim 1, said transistor device comprising one of a negative type (N-type) and a positive type (P-type) transistor.

6. An integrated circuit device comprising:
a substrate; and
a plurality of sets of integrated circuit transistor structures on said substrate,
said integrated circuit structures including gate insulators positioned on and contacting said substrate,
first sets of said integrated circuit transistor structures within said integrated circuit device comprising a first dopant in said substrate at a position where a corresponding gate insulator of said first sets of said integrated circuit transistor structures contacts said substrate,
said first dopant reducing power leakage of said first sets of said integrated circuit transistor structures relative to power leakage of other integrated circuit transistor structures within said integrated circuit device,
second sets of said integrated circuit transistor structures within said integrated circuit device comprising a second dopant in said substrate at a position where a corresponding gate insulator of said second sets of said integrated circuit transistor structures contacts said substrate,
said second dopant increasing power consumption of said second sets of said integrated circuit transistor structures relative to power consumption of other integrated circuit transistor structures within said integrated circuit device, and
said first dopant comprising fluorine and said second dopant comprising nitrogen.

7. The integrated circuit according to claim 6, said first sets of said integrated circuit transistor structures comprising different types of integrated circuit transistor structures from said second sets of said integrated circuit transistor structures.

8. The integrated circuit according to claim 6, said corresponding gate insulator of said first sets of said integrated circuit transistor structures having a different insulator thickness from said corresponding gate insulator of said second sets of said integrated circuit transistor structures.

9. The integrated circuit according to claim 6, said corresponding gate insulator of said first sets of said integrated circuit transistor structures and said corresponding gate insulator of said second sets of said integrated circuit transistor structures comprising high dielectric constant insulators having dielectric constants above 3.9.

10. The integrated circuit according to claim 6, said gate insulators comprising one of silicon nitride, silicon oxynitride, a gate dielectric stack of $SiO_2$ and $Si_3N_4$, metal oxides, tantalum oxide, hafnium silicate, zirconium silicate, hafnium dioxide, and zirconium dioxide.

11. The integrated circuit according to claim 6, said corresponding gate insulator of said first sets of said integrated circuit transistor structures and said corresponding gate insulator of said second sets of said integrated circuit transistor structures comprising asymmetric gate dielectrics that are thicker at a drain region compared to a source region.

12. A method of designing an integrated circuit, said method comprising:
evaluating an integrated circuit design for power consumption balance and power leakage balance, using a computerized device;
identifying first sets of integrated circuit transistor structures within said integrated circuit design that need reduced power leakage and second sets of integrated circuit transistor structures that need higher power consumption to achieve said power consumption balance and power leakage balance, based on said evaluating of said integrated circuit, using said computerized device;
altering said integrated circuit design to include implantation of a first dopant into a substrate before a gate insulator formation for said first sets of integrated circuit transistor structures to produce an altered integrated circuit design, using said computerized device;
altering said altered integrated circuit design to include implantation of a second dopant into a substrate before a gate insulator formation for said second sets of integrated circuit transistor structures to produce a further altered integrated circuit design, using said computerized device; and outputting said further altered integrated circuit design from said computerized device, said first dopant comprising fluorine and said second dopant comprising nitrogen.

13. The method according to claim 12, said first sets of integrated circuit transistor structures comprising different types of integrated circuit transistor structures from said second sets of integrated circuit transistor structures.

14. The method according to claim 12, said gate insulator formation for said first sets of integrated circuit transistor structures forming a different insulator thickness from said gate insulator formation for said second sets of integrated circuit transistor structures.

15. The method according to claim 12, said gate insulator formation for said first sets of integrated circuit transistor structures and said gate insulator formation for said second sets of integrated circuit transistor structures forming high dielectric constant insulators having dielectric constants above 3.9.

16. The method according to claim 12, said gate insulator formation for said first sets of integrated circuit transistor structures and said gate insulator formation for said second sets of integrated circuit transistor structures forming high dielectric constant insulators comprising one of silicon nitride, silicon oxynitride, a gate dielectric stack of $SiO_2$ and $Si_3N_4$, metal oxides, tantalum oxide, hafnium silicate, zirconium silicate, hafnium dioxide, and zirconium dioxide.

17. The method according to claim 12, said gate insulator of said first sets of said integrated circuit transistor structures and said gate insulator of said second sets of said integrated circuit transistor structures comprising asymmetric gate dielectrics that are thicker at a drain region compared to a source region.

18. A method of manufacturing an integrated circuit, said method comprising:

evaluating an integrated circuit design for power consumption balance and power leakage balance, using a computerized device;

identifying first sets of integrated circuit transistor structures within said integrated circuit design that need reduced power leakage and second sets of integrated circuit transistor structures that need higher power consumption to achieve said power consumption balance and power leakage balance, based on said evaluating of said integrated circuit, using said computerized device;

altering said integrated circuit design to include implantation of a first dopant into a substrate before a gate insulator formation for said first sets of integrated circuit transistor structures to produce an altered integrated circuit design, using said computerized device;

altering said altered integrated circuit design to include implantation of a second dopant into a substrate before a gate insulator formation for said second sets of integrated circuit transistor structures to produce a further altered integrated circuit design, using said computerized device; and manufacturing an integrated circuit device according to said further altered integrated circuit design by processing raw materials through manufacturing equipment, said first dopant comprising fluorine and said second dopant comprising nitrogen.

19. The method according to claim 18, said first sets of integrated circuit transistor structures comprising different types of integrated circuit transistor structures from said second sets of integrated circuit transistor structures.

20. The method according to claim 18, said gate insulator formation for said first sets of integrated circuit transistor structures forming a different insulator thickness from said gate insulator formation for said second sets of integrated circuit transistor structures.

21. The method according to claim 18, said gate insulator formation for said first sets of integrated circuit transistor structures and said gate insulator formation for said second sets of integrated circuit transistor structures forming high dielectric constant insulators having dielectric constants above 3.9.

22. The method according to claim 18, said gate insulator formation for said first sets of integrated circuit transistor structures and said gate insulator formation for said second sets of integrated circuit transistor structures forming high dielectric constant insulators comprising one of silicon nitride, silicon oxynitride, a gate dielectric stack of $SiO_2$ and $Si_3N_4$, metal oxides, tantalum oxide, hafnium silicate, zirconium silicate, hafnium dioxide, and zirconium dioxide.

23. The method according to claim 18, said gate insulator of said first sets of said integrated circuit transistor structures and said gate insulator of said second sets of said integrated circuit transistor structures comprising asymmetric gate dielectrics that are thicker at a drain region compared to a source region.

* * * * *